(12) United States Patent
Park et al.

(10) Patent No.: US 9,869,906 B2
(45) Date of Patent: Jan. 16, 2018

(54) LIQUID CRYSTAL DISPLAY DEVICE COMPRISING A PLURALITY OF PIXEL ELECTRODES EACH HAVING FIRST, SECOND, AND THIRD STEM ELECTRODES

(71) Applicant: Samsung Display Co. Ltd., Yongin-si (KR)

(72) Inventors: Heung Shik Park, Seoul (KR); Sang Gyun Kim, Hwaseong-si (KR); Ki Chul Shin, Seongnam-si (KR); Jae Jin Lyu, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/354,774

(22) Filed: Nov. 17, 2016

(65) Prior Publication Data

US 2017/0293185 A1    Oct. 12, 2017

(30) Foreign Application Priority Data

Apr. 8, 2016    (KR) .................. 10-2016-0043234

(51) Int. Cl.
    *G02F 1/1343*    (2006.01)
    *G02F 1/1337*    (2006.01)
    *G02F 1/1333*    (2006.01)

(52) U.S. Cl.
    CPC .. *G02F 1/134309* (2013.01); *G02F 1/133707* (2013.01); *G02F 1/134336* (2013.01); *G02F 1/13439* (2013.01); *G02F 2001/133357* (2013.01); *G02F 2001/134345* (2013.01); *G02F 2201/121* (2013.01); *G02F 2201/123* (2013.01)

(58) Field of Classification Search
    CPC ......... G02F 2201/121; G02F 2201/123; G02F 2001/133357; G02F 2001/134318
    See application file for complete search history.

(56) References Cited

U.S. PATENT DOCUMENTS

| | | | |
|---|---|---|---|
| 8,304,039 B2 | 11/2012 | Oh et al. | |
| 2011/0141423 A1* | 6/2011 | Cheng | G02F 1/133707 349/141 |
| 2011/0261278 A1* | 10/2011 | Oh | G02F 1/133723 349/48 |
| 2014/0043571 A1* | 2/2014 | Chang | G02F 1/139 349/123 |
| 2015/0049273 A1* | 2/2015 | Hong | G02F 1/133512 349/38 |

\* cited by examiner

*Primary Examiner* — Paul Lee
(74) *Attorney, Agent, or Firm* — Cantor Colburn LLP

(57) ABSTRACT

A liquid crystal display device includes pixels, each including a pixel electrode including first and second stem electrodes, which extend in a first direction and are spaced apart from each other, a third stem electrode, which extends in a second direction perpendicular to the first direction and intersects the first and second stem electrodes, a first edge electrode, which extends in the second direction and intersects first ends of the first and second stem electrodes, a second edge electrode, which extends in the second direction and intersects second ends of the first and second stem electrodes, and branch electrodes, which extend from the first, second, and third stem electrodes in a direction which is different from the first and second directions where a boundary line is defined between the first and second stem electrode.

20 Claims, 13 Drawing Sheets

LIQUID CRYSTAL DISPLAY DEVICE COMPRISING A PLURALITY OF PIXEL ELECTRODES EACH HAVING FIRST, SECOND, AND THIRD STEM ELECTRODES

This application claims priority to Korean Patent Application No. 10-2016-0043234 filed on Apr. 8, 2016, and all the benefits accruing therefrom under 35 U.S.C. §119, the content f which in its entirety is herein incorporated by reference.

BACKGROUND

1. Field

Exemplary embodiments of the invention relate to a liquid crystal display ("LCD") device.

2. Description of the Related Art

A liquid crystal display ("LCD") device, which is one of the most widely-used flat panel displays, generally includes two substrates on which field-generating electrodes such as pixel electrodes and a common electrode are formed and a liquid crystal layer which is inserted is between the two substrates. The LCD device generates an electric field in the liquid crystal layer by applying a voltage to the field-generating electrodes, and displays an image by determining an orientation of liquid crystal molecules in the liquid crystal layer and controlling a polarization of an incident light using the electric field.

A vertical alignment ("VA")-mode LCD device in which liquid crystal molecules are aligned so as for their long axes to be perpendicular to upper and lower substrates in an absence of an electric field has been developed.

To realize a wide viewing angle in the VA-mode LCD device, a plurality of domains that differ from one another in the alignment direction of liquid crystal molecules may be formed in each pixel.

Various methods such as defining cutouts such as slits on field-generating electrodes such as pixel electrodes and forming protrusions on the field-generating electrodes are used to define a plurality of domains in each pixel of an LCD device.

In the meantime, a regional luminance of a VA-mode LCD device may differ from when the VA-mode LCD device is viewed from the front to when the VA-mode LCD device is viewed from a side. That is, a visibility of the VA-mode LCD device may decrease. To address such a problem, each pixel may be divided into two sub-pixels, and different voltages may be respectively applied to the two sub-pixels.

SUMMARY

A configuration for applying two different voltages respectively to the two sub-pixels of each pixel needs more components than a configuration for applying a single voltage to each pixel and may thus a lower the transmittance of an LCD device.

Exemplary embodiments of the invention provide a liquid crystal display ("LCD") device capable of improving visibility and minimizing a decrease in transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a liquid crystal display device. The liquid crystal display device includes a plurality of pixels, each including a pixel electrode, where each of the pixel electrodes includes first and second stem electrodes, which extend in a first direction and are spaced apart from each other, a third stem electrode, which extends in a second direction that is perpendicular to the first direction and is disposed to intersect the first and second stem electrodes, a first edge electrode, which extends in the second direction and is disposed to intersect first ends of the first and second stem electrodes, a second edge electrode, which extends in the second direction and is disposed to intersect second ends of the first and second stem electrodes, and a plurality of branch electrodes, which extend from at least one of the first, second, and third stem electrodes in a direction different from the first and second directions, a border line, which is defined by the ends of at least two of the branch electrodes facing each other, is defined between the first and second stem electrode, and the first stem electrode, the border line, and the second stem electrode divide a pixel region in which the corresponding pixel electrode is disposed into a first edge area, a first central area, a second central area, and a second edge area, which are sequentially arranged along the second direction.

According to another exemplary embodiment of the invention, there is provided a liquid crystal display device. The liquid crystal display device includes a substrate including a plurality of pixels, which are arranged in a matrix form, and a plurality of pixel electrodes disposed on the substrate and provided in the pixels, respectively, where each of the pixel electrodes includes first and second stem electrodes, which extend in a first direction and are spaced apart from each other, a third stem electrode, which extends in a second direction that is perpendicular to the first direction and is disposed to intersect the first and second stem electrodes, a first edge electrode, which extends in the second direction and is disposed to intersect first ends of the first and second stem electrodes, a second edge electrode, which extends in the second direction and is disposed to intersect second ends of the first and second stem electrodes, and a plurality of branch electrodes, which extend from at least one of the first, second, and third stem electrodes in a direction which is different from the first and second directions, and a pixel region in which the corresponding pixel electrode is disposed is divided into a central area, which is surrounded by the first and second stem electrodes and the first and second edge electrodes, and first and second edge areas, which are defined in first and second sides, respectively, of the central area in the second direction.

According to the exemplary embodiments, an LCD device which improves visibility and minimizes a decrease in transmittance may be provided.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
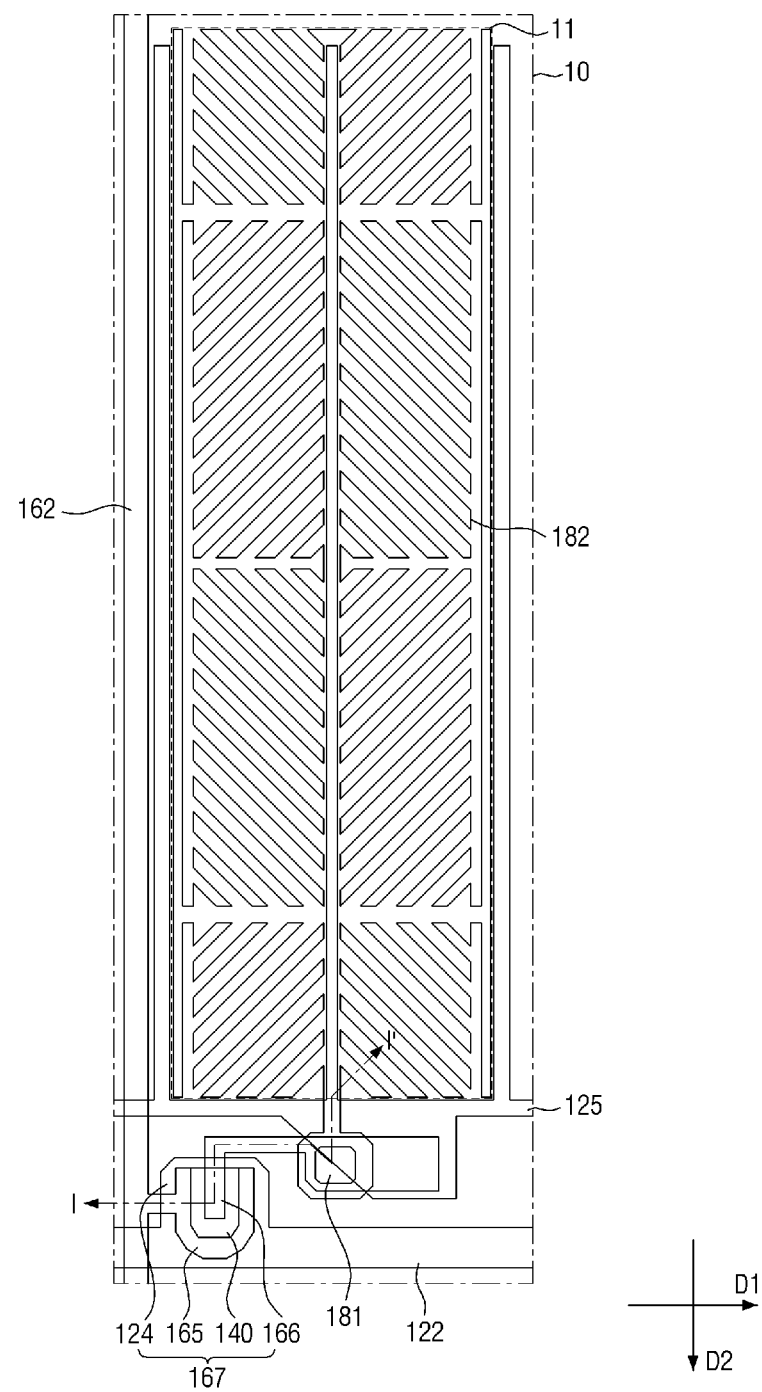
FIG. 1 is a plan view of a pixel of a liquid crystal display ("LCD") device according to an exemplary embodiment of the invention.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element is referred to as being "on" another element, it can be directly on the other element or intervening elements may be therebetween. In contrast, when an element is referred to as being "directly on" another element, there are no intervening elements present.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, preferred embodiments of the invention will be described in detail with reference to the accompanying drawings.

Figure 2:
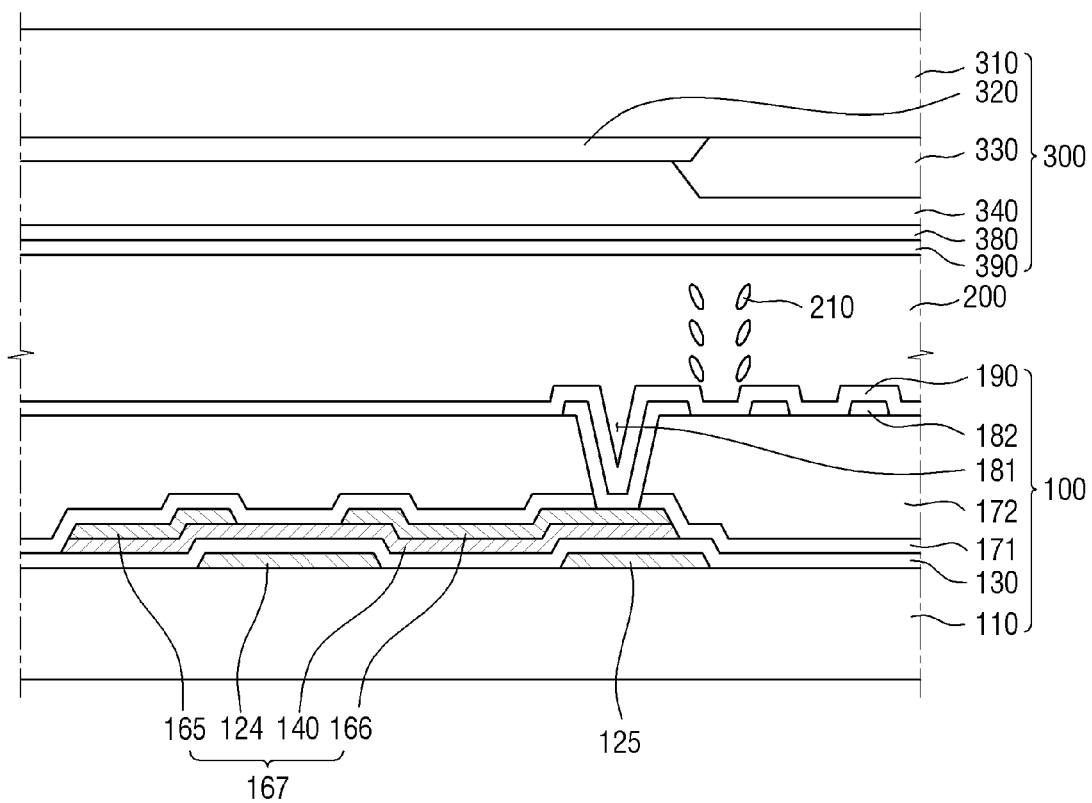
FIG. 2 is a cross-sectional view taken along line I-I' of FIG. 1.
Figure 3:
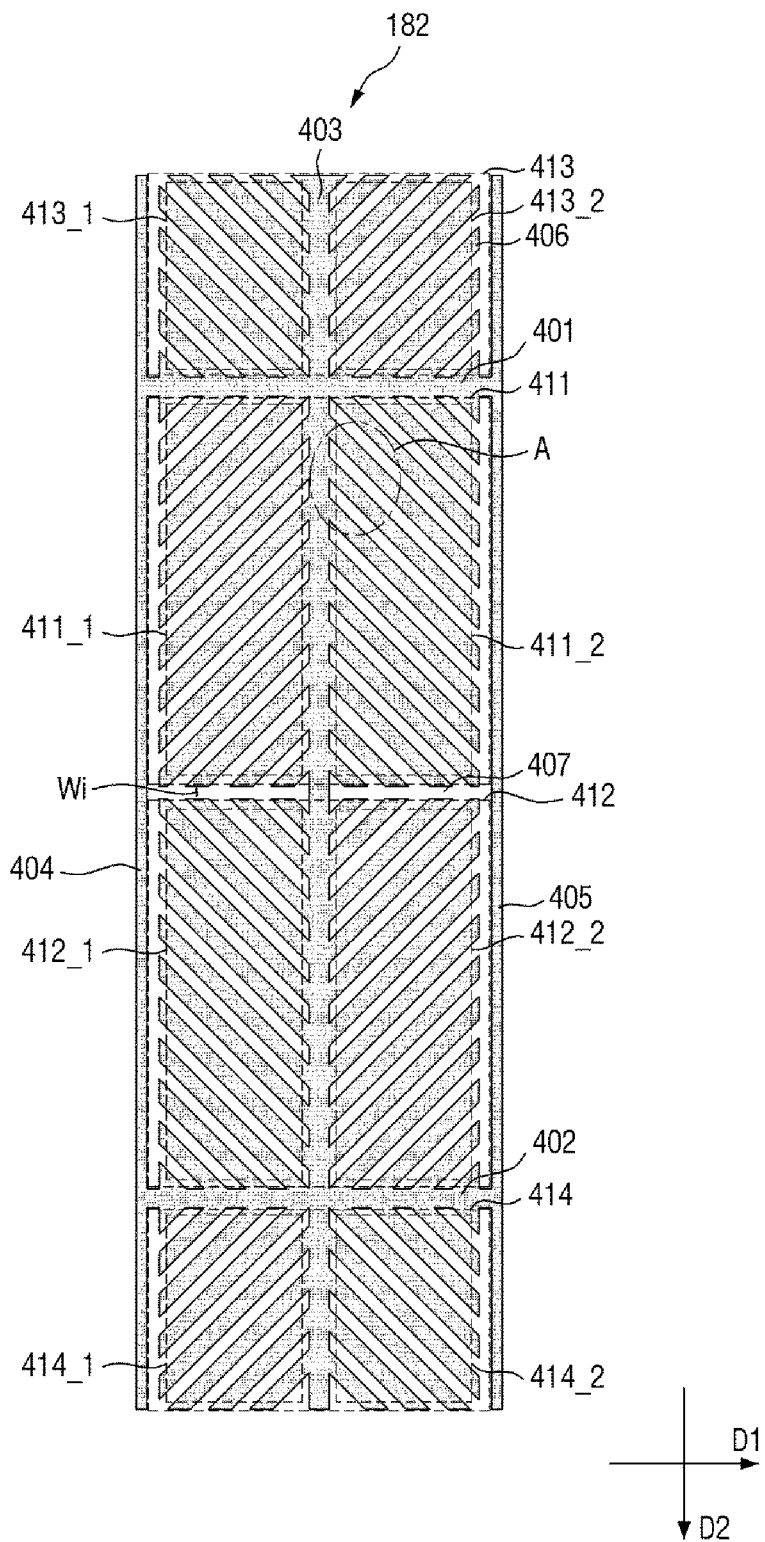
FIG. 3 is an enlarged plan view of a pixel electrode of FIG. 1.

FIG. 1 is a plan view of a pixel of a liquid crystal display ("LCD") device according to an exemplary embodiment of the invention, FIG. 2 is a cross-sectional view taken along line I-I' of FIG. 1, and FIG. 3 is an enlarged plan view of a pixel electrode of FIG. 1.

Referring to FIGS. 1 through 3, the LCD device according to the illustrated exemplary embodiment may include a first display substrate 100, a second display substrate 300, and a liquid crystal layer 200.

The LCD device according to the illustrated exemplary embodiment further includes a pixel 10, which is arranged in a matrix form with other pixels. The pixel 10 may be a basic unit for displaying a color with a particular gray level. The first display substrate 100 includes a pixel electrode 182, which is disposed in the pixel 10, and a thin-film transistor ("TFT") 167, which is a switching device for providing a data voltage to the pixel electrode 182. The second display substrate 300 may face the first display substrate 100. The liquid crystal layer 200 is a space in which liquid crystal molecules 210 injected between the first and second display substrates 100 and 300 reside.

The first display substrate 100 will hereinafter be described.

The first display substrate 100 includes a first base substrate 110. The first base substrate 110 may be a transparent insulating substrate. In an exemplary embodiment, the first base substrate 110 may be provided as a glass substrate, a quartz substrate, or a transparent resin substrate, for example. The first base substrate 110 may be a flat substrate, or may be curved along one direction.

A gate line 122, a gate electrode 124, and a sustain line 125 may be disposed on the first base substrate 110.

The gate line 122 transmits a gate signal, which controls the TFT 167. The gate line 122 may extend in a first direction D1. The first direction D1 may be a direction parallel to one side of the first base substrate 110, and may be defined as a direction indicated by an arbitrary straight line extending from the left to the right of FIG. 2. However, the first direction D1 is not particularly limited to the direction parallel to one side of the first base substrate 110, but may be a direction indicated by a straight line extending across the first base substrate 100 in any particular direction.

The gate signal may be a signal having a variable voltage, provided by an external source. The turning on or off of the TFT 167 may be controlled by the voltage of the gate signal.

The gate electrode 124 is connected to the gate line 122. The gate electrode 124 may protrude from the gate line 122, and serve as a control electrode of the TFT 167. The gate line 122 may be connected to a plurality of gate electrodes 124.

The sustain line 125 may be disposed between the gate line 122 and another gate line next to the gate line 122 and may extend substantially in the first direction D1. The sustain line 125 may be adjacent to the pixel electrode 182 or partially overlapped by the pixel electrode 182. The sustain line 125 has a predetermined capacitance with the pixel electrode 182 and maintains the voltage that the pixel electrode 182 is charged with. In another exemplary embodiment, the sustain line 125 may not be provided when a voltage drop in the pixel electrode 182 is expected to be relatively insignificant in the absence of the sustain line 125.

The shape in which the sustain line 125 is overlapped by the pixel electrode 182 will be described later.

In an exemplary embodiment, the gate line 122, the gate electrode 124, and the sustain line 125 may include aluminum (Al), an Al-based metal such as an Al alloy, silver (Ag), a Ag-based metal such as a Ag alloy, copper (Cu), a Cu-based metal such as a Cu alloy, molybdenum (Mo), a Mo-based metal such as a Mo alloy, chromium (Cr), tantalum (Ta), titanium (Ti), or any combinations thereof. The gate line 122, the gate electrode 124, and the sustain line 125 may have a single-layer structure or may have a multilayer structure including two conductive films having different physical properties.

A gate insulating layer 130 is disposed on the gate line 122, the gate electrode 124, and the sustain line 125. The gate insulating layer 130 may include an insulating material. In an exemplary embodiment, the gate insulating layer 130 may include silicon nitride or silicon oxide, for example. The gate insulating layer 130 may have a single-layer structure or may have a multilayer structure including two insulating films having different physical properties.

A semiconductor layer 140 is disposed on the gate insulating layer 130. The semiconductor layer 140 may at least partially overlap the gate electrode 124. In an exemplary embodiment, the semiconductor layer 140 may include amorphous silicon, polycrystalline silicon, or an oxide semiconductor, for example.

The semiconductor layer 140 may not only overlap the gate electrode 124, but also overlap, at least partially or entirely, a data line 162, a source electrode 165, and a drain electrode 166.

Although not illustrated in FIGS. 1 through 3, in exemplary embodiments, ohmic contact members may be additionally provided on the semiconductor layer 140. In an exemplary embodiment, the ohmic contact members may include n+ hydrogenated amorphous silicon doped with a high concentration of n-type impurities, or silicide, for example. The ohmic contact members may be disposed on the semiconductor layer 140 in a pair. The ohmic contact members, which are disposed among the source electrode 165, the drain electrode 166, and the semiconductor layer 140, may enable the source electrode 165, the drain electrode 166, and the semiconductor layer 140 to have ohmic contact properties.

The data line 162, the source electrode 165, and the drain electrode 166 are disposed on the semiconductor layer 140 and the gate insulating layer 130.

The data line 162 may extend in a second direction D2 and may intersect the gate line 122.

The second direction D2 may be a direction that crosses the first direction D1 at a right angle, for example, a direction indicated by an arbitrary straight line extending from the top to the bottom of FIG. 1, but the invention is not limited thereto. That is, the angle that the second direction D2 defines with the first direction D1 may not necessarily be a right angle, and the second direction D2 may be a direction indicated by an arbitrary straight line not extending in parallel to the first direction D1.

The data line 162 may be insulated from the gate line 122, the gate electrode 124, and the sustain line 125 by the gate insulating layer 130.

The data line 162 may provide a data signal to the source electrode 165. The data signal may be a signal having a variable voltage, provided by an external source. The gray level of the pixel 10 may be controlled by the data signal.

The source electrode 165 may be branched off from the data line 162 and may at least partially overlap the gate electrode 124.

The drain electrode 166 may be spaced apart from the source electrode 165, in a plan view, over the semiconductor layer 140 and may partially overlap the gate electrode 124. As illustrated in FIG. 1, the source electrode 165 may be provided in a "U" shape, for example, to surround the drain electrode 166 with a predetermined gap provided therebetween, but the invention is not limited thereto. That is, in another exemplary embodiment, the source electrode 165 may extend in a bar shape to be in parallel to the drain electrode 166 and may be spaced apart from the drain electrode 166 by a uniform gap therebetween.

The semiconductor layer 140 may be disposed even in an area between the source electrode 165 and the drain electrode 166, which are spaced apart from each other. That is, the source electrode 165 and the drain electrode 166 may partially overlap or contact the semiconductor layer 140 and may face each other with the semiconductor layer 140 interposed therebetween.

In an exemplary embodiment, the data line 162, the source electrode 165, and the drain electrode 166 may include Al, Cu, Ag, Mo, Cr, Ti, Ta or any alloys thereof, for example. The data line 162, the source electrode 165, and the drain electrode 166 may have a multilayer structure including a lower film including a refractory metal and a low-resistance upper film disposed on the lower film, but the invention is not limited thereto.

The gate electrode 124, the semiconductor layer 140, the source electrode 165, and the drain electrode 166 may form the TFT 167. The TFT 167 may electrically connect the source electrode 165 and the drain electrode 166 according to the voltage of the gate signal provided to the gate electrode 124. More specifically, when the voltage of the gate signal provided to the gate electrode 124 is a voltage for turning off the TFT 167, the source electrode 165 and the drain electrode 166 may be electrically disconnected. When the voltage of the gate signal provided to the gate electrode 124 is a voltage for turning on the TFT 167, the source electrode 165 and the drain electrode 166 may be electrically connected via a channel defined in the semiconductor layer 140.

A channel is defined mainly in a part of the semiconductor layer 140 in the area between the source electrode 165 and the drain electrode 166. That is, in a case in which the TFT 167 is in an on state, a channel is defined mainly in the part of the semiconductor layer 140 in the area between the source electrode 165 and the drain electrode 166, and thus, the voltage of the source electrode 165 may be transmitted to the drain electrode 166 via the channel. The data signal transmitted to the drain electrode 166 may also be transmitted to the pixel electrode 182.

A passivation layer 171 is disposed on the gate insulating layer 130 and the TFT 167. The passivation layer 171 may include an inorganic insulating material and may cover the TFT 167. The passivation layer 171 may protect the TFT 167 from elements disposed on the TFT 167.

A planarization layer 172 is disposed on the passivation layer 171. The planarization layer 172 may have a function of planarizing a surface. The planarization layer 172 may include an organic material. In exemplary embodiments, the planarization layer 172 may include a photosensitive organic composition, for example. In other exemplary embodiments, the planarization layer 172 may include a material including a pigment for realizing a color, or a photosensitive organic composition layer including the pigment may be additionally provided below the planarization layer 172, for example. Since the pigment can perform the functions of a color filter, a color filter layer 330 of the second display substrate 300 that will be described later may not be provided.

In another exemplary embodiment, one of the passivation layer 171 and the planarization layer 172 may not be provided.

A contact hole 181, which exposes a part of the TFT 167, particularly, a part of the drain electrode 166, may be defined in the passivation layer 171 and the planarization layer 172.

The contact hole 181 may be defined to vertically penetrate the planarization layer 172 and the passivation layer 171. The contact hole 181 may be defined to expose and overlap a part of the drain electrode 166.

The pixel electrode 182 is disposed on the planarization layer 172. The pixel electrode 182 may be physically connected to the drain electrode 166 via the contact hole 181 and may thus be provided with a voltage by the drain electrode 166.

In an exemplary embodiment, the pixel electrode 182 may include a transparent conductive material such as indium tin oxide ("ITO"), indium zinc oxide ("IZO"), indium tin zinc oxide ("ITZO"), or Al-doped zinc oxide ("AZO").

Openings in which no conductive material is provided may be defined in the pixel electrode 182. Due to the openings, a pattern may be provided on the pixel electrode 182, and a direction in which the liquid crystal molecules 210 are tilted over the pixel electrode 182 may be controlled by the shape and pattern of the pixel electrode 182.

The shape of the pixel electrode 182 will hereinafter be described.

The pixel electrode 182 includes first, second, and third stem electrodes 401, 402, and 403, a plurality of branch electrodes 406, and first and second edge electrodes 404 and 405.

The first and second stem electrodes 401 and 402 may extend in the first direction D1 and may be spaced apart from each other. A boundary line 407, which extends in the first direction D1, may be defined between the first and second stem electrodes 401 and 402. Here, the term "boundary line" may be any types of a line-shaped area including an incision line, for example. The first stem electrode 401, the boundary line 407, and the second stem electrode 402 may be sequentially arranged along the second direction D2, and as a result, a region in which the pixel electrode 182 is disposed, i.e., a pixel region 11, may be divided into a first edge area 413, a first central area 411, a second central area 412, and a second edge area 414.

The boundary line 407 may be defined along the boundary between the first and second central areas 411 and 412. Some of the branch electrodes 406 extending in different directions may end at the boundary line 407. In an exemplary embodiment, a width Wi of the boundary line 407 may be about 2 micrometers (μm) to about 10 μm, for example.

The third stem electrode 403 may extend in the second direction D2 and may intersect the first and second stem electrodes 401 and 402. The third stem electrode 403 may intersect the first stem electrode 401 in the shape of a cross (+), and may also interest the second stem electrode 402 in the shape of a cross (+). Accordingly, the third stem electrode 403 may connect the first and second stem electrodes 401 and 402.

The branch electrodes 406 may extend from the first, second, and third stem electrodes 401, 402, and 403 in a diagonal direction not in parallel to the first direction D1 or the second direction D2.

The first and second edge electrodes 404 and 405 may both extend in the second direction D2.

The first edge electrode 404 may intersect a first end (for example, the left end) of the first stem electrode 401 and a first end (for example, the left end) of the second stem electrode 402. Accordingly, the first edge electrode 404 may connect the first and second stem electrodes 401 and 402.

The second edge electrode 405 may intersect a second end (for example, the right end) of the first stem electrode 401 and a second end (for example, the right end) of the second stem electrode 402. Accordingly, the second edge electrode 405, like the first edge electrode 404, may connect the first and second stem electrodes 401 and 402.

The first and second edge electrodes 404 and 405 may extend to have the same length in the second direction D2 as that of the third stem electrode 403. The first and second central areas 411 and 412 and the first and second edge areas 413 and 414 may all be defined between the first and second edge electrodes 404 and 405. As a result, the first and second central areas 411 and 412 may be surrounded by the first and second stem electrodes 401 and 402 and the first and second edge electrodes 404 and 405.

The branch electrodes 406 may not be directly connected to the first and second edge electrodes 404 and 405. Accordingly, the ends of the branch electrodes 406 may be spaced apart from the first and second edge electrodes 404 and 405 by a predetermined gap.

The branch electrodes 406 extend in different directions in the first and second central areas 411 and 412, and thus, the liquid crystal molecules 210 may be tilted in different directions on both sides of the boundary line 407.

The angle that the branch electrodes 406 define with the first direction D1 may be uniform throughout the first and second central areas 411 and 412 and the first and second edge areas 413 and 414. In an exemplary embodiment, the branch electrodes 406 may extend to define an angle of about 45 degrees (°) with the first direction D1, for example. However, the invention is not limited to this. That is, the direction in which the branch electrodes 406 may differ from one part to another part of the pixel electrode 182.

The angle that the branch electrodes 406 define with the first direction D1 may indicate the angle that the branch electrodes 406 define with an arbitrary straight line extending in the first direction D1, and when the branch electrodes 406 define both an acute angle and an obtuse angle with the first direction D1, the acute angle may be determined as the angle that the branch electrodes 406 define with the first direction D1.

More specifically, the branch electrodes 406 may extend in an upper left direction from the third stem electrode 403 in the left half of the first edge area 413. The branch electrodes 406 may extend in an upper right direction from the third stem electrode 403 in the right half of the first edge area 413.

The branch electrodes 406 may extend in a lower left direction from the third stem electrode 403 in the left half of the first central area 411, and may extend in a lower right direction from the third stem electrode 403 in the right half of the first central area 411.

The branch electrodes 406 may extend in the upper left direction from the third stem electrode 403 in the left half of the second central area 412, and may extend in the upper right direction from the third stem electrode 403 in the right half of the second central area 412.

The branch electrodes 406 may extend in the lower left direction from the third stem electrode 403 in the left half of the second edge area 414, and may extend in the lower right direction from the third stem electrode 403 in the right half of the second edge area 414.

Since the branch electrodes 406 extend in different directions in different parts of the pixel region 11, the liquid crystal molecules 210 may be tilted in various directions over the branch electrodes 406. Thus, the viewing angle of the LCD device according to the exemplary embodiment may be improved.

Due to the arrangement of the first, second, and third stem electrodes 401, 402, and 403 and the first and second edge electrodes 404 and 405, the visibility of the LCD device according to the exemplary embodiment may be improved.

As mentioned above, the first and second central areas 411 and 412 may be surrounded by the first and second stem electrodes 401 and 402 and the first and second edge electrodes 404 and 405. Thus, the first and second stem electrodes 401 and 402 and the first and second edge electrodes 404 and 405 may minimize the influence of an electric field generated outside the first and second central areas 411 and 412 on the liquid crystal molecules 210 in the first and second central areas 411 and 412.

Openings in which no transparent conductive material is provided may be defined between the first and second central areas 411 and 412 to define the boundary line 407, which extends in the first direction D1. The boundary line 407, unlike the first and second stem electrodes 401 and 402 and the first and second edge electrodes 404 and 405, does not block an electric field. Thus, an electric field generated in the first central area 411 and an electric field generated in the second central area 412 may affect each other. As a result, the control over the liquid crystal molecules 210 may be weakened in the first and second central areas 411 and 412, between which the boundary line 407 is defined and which control the liquid crystal molecules 210 in different directions.

The liquid crystal molecules 210 may be tilted in the upper right direction in the left half of the first central area 411 and may be tilted in the lower right direction in the left half of the second central area 412. That is, the liquid crystal molecule 210 may have the tendency to be tilted rightward in general, but in particular, in opposite directions, i.e., in upper and lower directions, in the left halves of the first and second central areas 411 and 412, respectively. Thus, the force to tilt the liquid crystal molecules 210 upward may be weakened in the left half of the first central area 411, and the force to tilt the liquid crystal molecules 210 downward may be weakened in the left half of the second central area 412. This principle may directly apply to the liquid crystal molecules 210 in the right halves of the first and second central areas 411 and 412.

Accordingly, the angle that the liquid crystal molecules 210 define with the first direction D1 in the first and second central areas 411 and 412 may be minimized, and thus, the visibility of the LCD device according to the exemplary embodiment may be improved. This will hereinafter be described in further detail with reference to FIGS. 4 and 5.

In an exemplary embodiment, the first central area 411 may include a first sub-central area 411_1 and a second sub-central area 411_2, the second central area 412 may include a third ub-central area 412_1 and a fourth sub-central area 412_2, the first edge area 413 may include a first sub-edge area 413_1 and a second sub-edge area 413_2, and the second edge area 414 may include a third sub-edge area 414_1 and a fourth sub-edge area 414_2. In the exemplary embodiment, first sub-branch electrodes defining the first sub-central area 411_1, third sub-branch electrodes defining the third sub-central area 412_1, fifth sub-branch electrodes defining the first sub-edge area 413_1 and seventh sub-branch electrodes defining the sub-edge area 414_1 may be symmetrical to second sub-branch electrodes defining the second sub-central area 411_2, fourth sub-branch electrodes defining the fourth sub-central area 412_2, sixth sub-branch electrodes defining the second sub-edge area 413_2 and eighth sub-branch electrodes defining the fourth sub-edge area 414_2, respectively, with reference to the third stem electrode 403.

Figure 4:
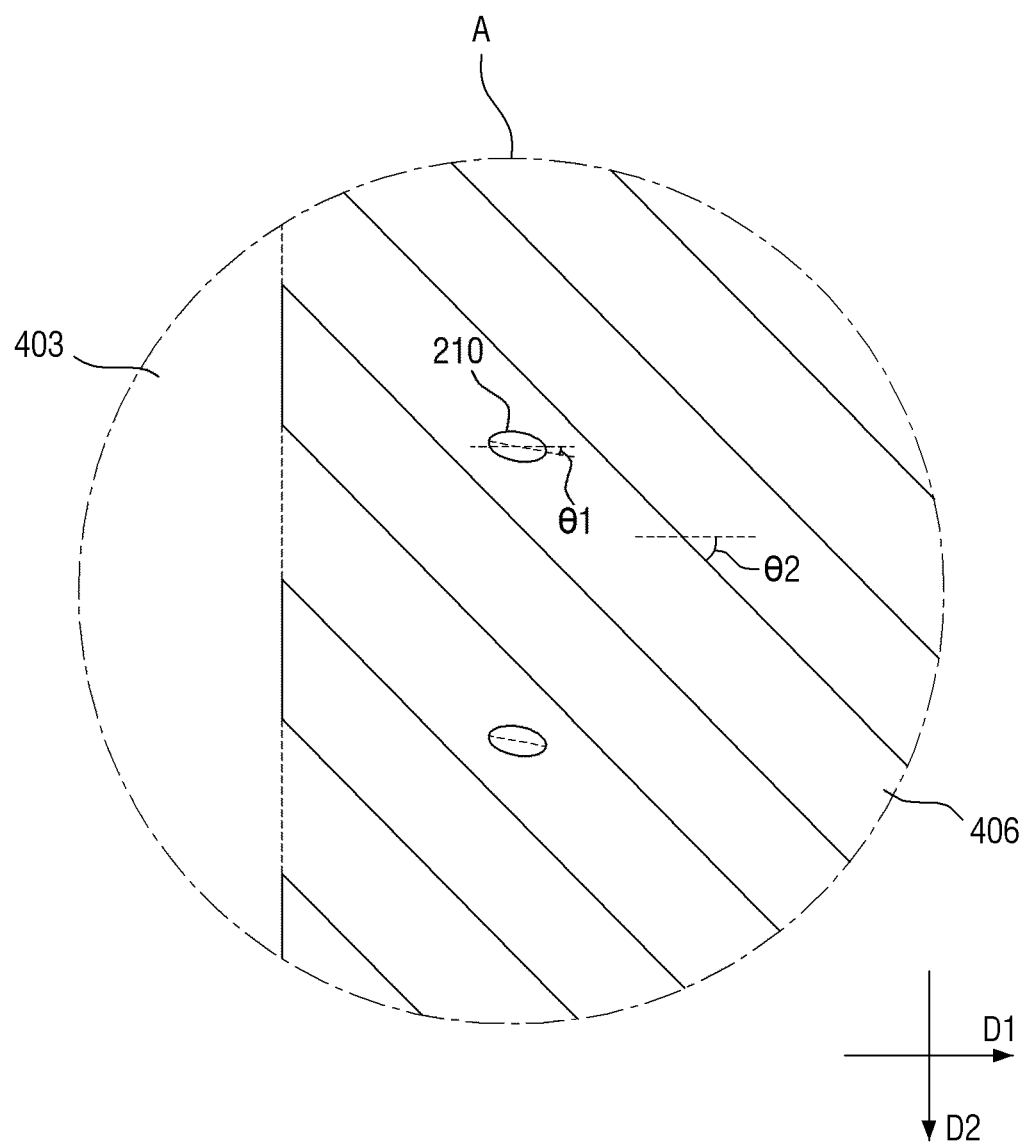
FIG. 4 is an enlarged plan view of an area A of FIG. 3 at a low gray level with a relatively low voltage provided to the pixel electrode of the LCD device according to the exemplary embodiment of FIG. 1.
Figure 5:
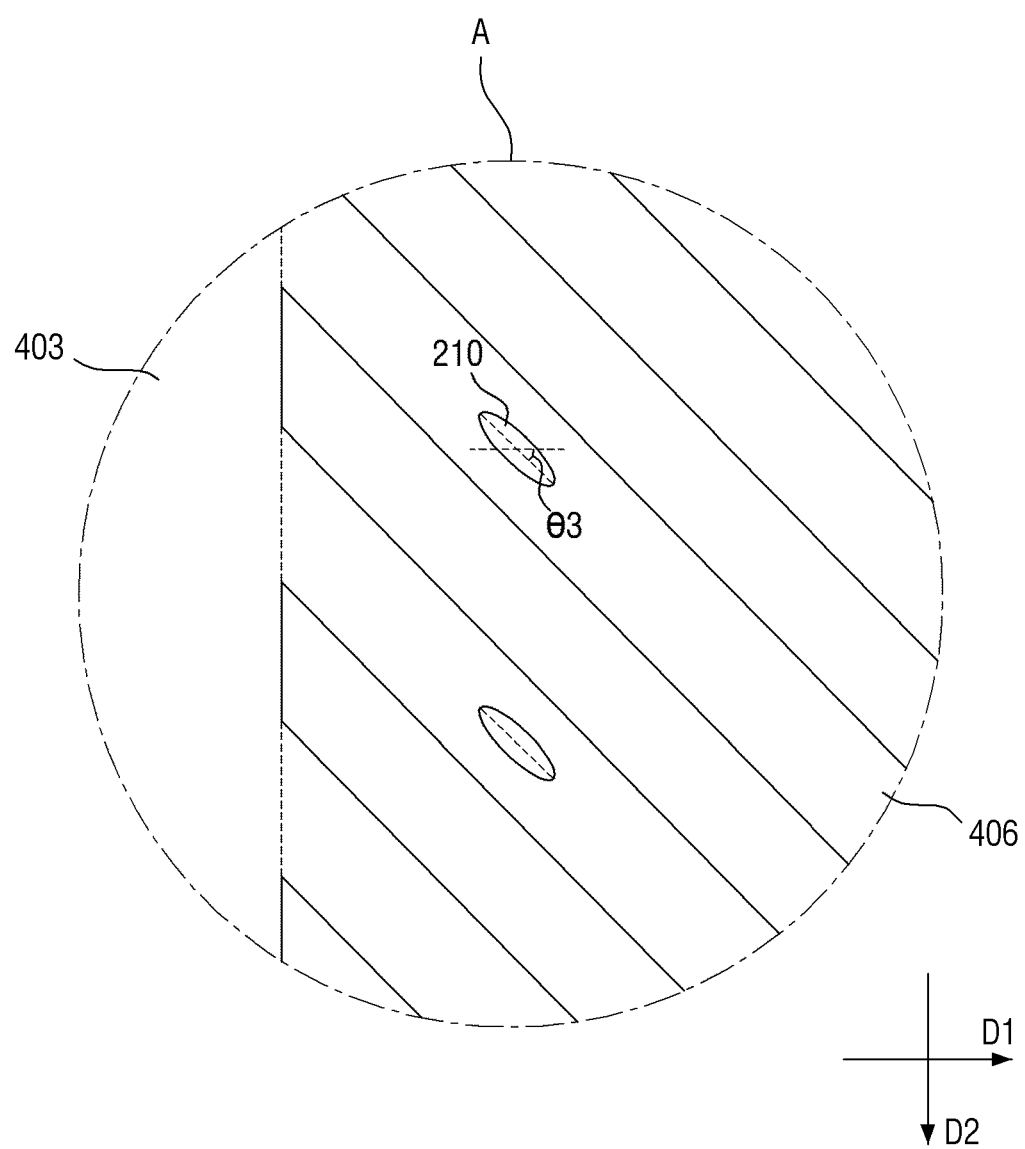
FIG. 5 is an enlarged plan view of the area A of FIG. 3 at a high gray level with a relatively high voltage provided to the pixel electrode of the LCD device according to the exemplary embodiment of FIG. 1.

FIG. 4 is an enlarged plan view of an area A of FIG. 3 at a low gray level with a relatively low voltage provided to the pixel electrode 182, and FIG. 5 is an enlarged plan view of the area A of FIG. 3 at a high gray level with a relatively high voltage provided to the pixel electrode 182.

FIGS. 4 and 5 both illustrate the same part of the pixel electrode 182, and thus, the pixel electrode 182 of FIG. 4 has the same structure as the pixel electrode 182 of FIG. 5. However, since FIGS. 4 and 5 illustrate different cases in terms of the level of the voltage applied to the pixel electrode 182, the pixel electrode 182 of FIG. 4 may differ from the pixel electrode 182 of FIG. 5 in terms of the pattern of the alignment of the liquid crystal molecules 210.

FIGS. 4 and 5 illustrate the liquid crystal molecules 210 as viewed in a plan view. Thus, the longer the long axes of the liquid crystal molecules 210 appear to be in FIGS. 4 and 5, the more tilted the liquid crystal molecules 210 are, and the direction in which the long axes of the liquid crystal molecules 210 extend may refer to the direction in which the liquid crystal molecules 210 are tilted.

Referring to FIG. 4, in a case in which a relatively weak electric field is generated in the right half of the first central area 411, which corresponds to the area A, the liquid crystal molecules 210 may be tilted to form a first angle $\theta 1$ with the first direction D1. As mentioned above, an electric field generated in the first central area 411 and an electric field generated in the second central area 412 affect each other, and thus, the control over the liquid crystal io molecules 210 may be weakened in the first and second central areas 411 and 412. Accordingly, the first angle $\theta 1$ may be smaller than a second angle $\theta 2$ that the direction in which the branch electrodes 406 extend defines with the first direction D1.

Referring to FIG. 5, in a case in which a relatively strong electric field is generated in the right half of the first central area 411, which corresponds to the area A, the liquid crystal molecules 210 may be tilted to form a third angle $\theta 3$ with the first direction D1. Since a relatively high voltage is provided to the pixel electrode 182, the liquid crystal molecules 210 are affected considerably by the pixel electrode 182. Thus, the third angle $\theta 3$ may be greater than the first angle $\theta 1$ and may be similar to the second angle $\theta 2$.

Due to the liquid crystal molecules 210 being tilted in different directions at a low gray level and a high gray level, the visibility of the LCD device according to the exemplary embodiment may be improved, and this effect may be further achieved by arrangement of an upper polarizer (not illustrated) and a lower polarizer (not illustrated).

More specifically, the LCD device according to the exemplary embodiment may further include the lower polarizer, which is disposed on the outside of the first display substrate 100, and the upper polarizer, which is disposed on the outside of the second display substrate 300.

The transmittance of light may be determined by the direction of the polarization axis of the lower polarizer, the direction of the polarization axis of the upper polarizer, and the direction in which the liquid crystal molecules 210 are tilted. In an exemplary embodiment, in a case in which the polarization axis of the lower polarizer is parallel to the first direction D1 and the polarization axis of the upper polarizer is parallel to the second direction D2, the closer the angle that the liquid crystal molecules 210 define with the first direction D1 is to about 45°, the higher the transmittance of light becomes, for example. The closer the angle that the liquid crystal molecules 210 define with the first direction D1 is to about 0° or about 90°, the lower the transmittance of light becomes. A decrease in the transmittance of light may be more evident when the LCD device according to the exemplary embodiment is viewed from a side (i.e., the left or right side) than when the LCD device according to the exemplary embodiment is viewed from the front.

As mentioned above, at a low gray level, the liquid crystal molecules 210 are generally tilted to define an angle close to about 0° with the first direction D1 in the first central area 411. Thus, the transmittance of light may decrease when the LCD device according to the exemplary embodiment is viewed from a side. Due to this pattern of alignment of the liquid crystal molecules 210 in the first central area 411, a phenomenon in which the LCD device according to the exemplary embodiment appears brighter than necessary at a low gray level may be alleviated, and thus, the visibility of the LCD device according to the exemplary embodiment may be improved.

At a high gray level, the liquid crystal molecules 210 are generally tilted to define an angle close to about 45° with the first direction D1 in the first central area 411. Thus, a decrease in the transmittance of light may be minimized when the LCD device according to the exemplary embodiment is viewed from a side. In short, at a low gray level, the visibility of the LCD device according to the exemplary embodiment may be improved, and at a high gray level, a decrease in the transmittance of the LCD device according to the exemplary embodiment may be minimized.

The pattern of alignment of the liquid crystal molecules 210 in the first central area 411, described above with reference to FIGS. 4 and 5, may directly apply to the second central area 412, except that the direction in which the liquid crystal molecules 210 are tilted in the second central area 412 is opposite to the direction in which the liquid crystal molecules 210 are tilted in the first central area 411.

In an exemplary embodiment, the ratio of the sum of the areas of the first and second central areas 411 and 412 to the sum of the areas of the first and second edge areas 413 and 414 may be controlled to be within the range of about 1:1 to about 1:3, for example. The ratio of the sum of the areas of the first and second central areas 411 and 412 to the sum of the areas of the first and second edge areas 413 and 414 may be determined according to the degree to which the visibility of the LCD device according to the exemplary embodiment should be improved.

A part of the sustain line 125 may be overlapped by the third stem electrode 403. As mentioned above, the sustain line 125 includes an opaque metal and thus does not transmit light therethrough. Thus, light leakage that may be caused by a misalignment of the liquid crystal molecules 210 in an area where the third stem electrode 403 is disposed may be prevented.

The elements disposed on the pixel electrode 182 will hereinafter be described with reference to FIGS. 1 through 3.

A first alignment layer 190 may be disposed on the pixel electrode 182. The first alignment layer 190 may control the initial alignment angle of the liquid crystal molecules 210, which are injected into the liquid crystal layer 200. In another exemplary embodiment, the first alignment layer 190 may not be provided.

The second display substrate 300 will hereinafter be described.

The second display substrate 300 may include a second base substrate 310, a light-shielding member 320, a color filter layer 330, a common electrode 380, an overcoat layer 340, and a second alignment layer 390.

The second base substrate 310 may face the first base substrate 110. The second base substrate 310 may be durable enough to withstand an external shock. The second base substrate 310 may be a transparent insulating substrate. In an exemplary embodiment, the second base substrate 310 may be a glass substrate, a quartz substrate, a transparent resin substrate, or the like, for example. The second base substrate 310 may be in the shape of a flat plate, or may be curved in a particular direction.

The light-shielding member 320 is disposed on the second base substrate 310 (e.g., below the second base substrate 310 in FIG. 2). The light-shielding member 320 may overlap the gate line 122, the sustain line 125, the data line 162, the TFT 167, and the contact hole 181, i.e., a region other than the pixel region 11, and may block the transmission of light in the region other than the pixel region 11.

The color filter layer 330 is disposed on the second base substrate 310 and the light-shielding member 320 (e.g., below the second base substrate 310 and the light-shielding member 320 in FIG. 2). The color filter layer 330 may render light incident from the outside of the first base substrate 110 and emitted to the outside of the second base substrate 310 to appear in a particular color.

The color filter layer 330 may include a photosensitive organic composition including a pigment for realizing a color. In an exemplary embodiment, the color filter layer 330 may include one of a red pigment, a green pigment, and a blue pigment, for example. However, the invention is not limited thereto, and the color filter layer 330 may include various other color pigments.

The arrangement of the color filter layer 330 is not particularly limited. That is, as mentioned above, the color filter layer 330 may be disposed on the first base substrate 110, instead of on the second base substrate 310.

The overcoat layer 340 is disposed on the light-shielding member 320 and the color filter layer 330 (e.g., below the light-shielding member 320 and the color filter layer 330 in FIG. 2). The overcoat layer 340 may reduce any height differences generated by the light-shielding member 320 and the color filter layer 330. In exemplary embodiments, the overcoat layer 340 may not be provided.

The common electrode 380 is disposed on the overcoat layer 340 (e.g., below the overcoat layer 340 in FIG. 2). In a case in which the overcoat layer 340 is not provided, the common electrode 380 may be disposed on the light-shielding member 320 and the color filter layer 330. In an exemplary embodiment, the common electrode 380 may include a transparent conductive material such as ITO, IZO, ITZO, or AZO. The common electrode 380 may be disposed on the entire surface of the second base substrate 310. A common signal provided by an external source is applied to the common electrode 380, and the common electrode 380 may generate an electric field together with the pixel electrode 182.

The second alignment layer 390 is disposed on the common electrode 380 (e.g., below the common electrode 380 in FIG. 2). The second alignment layer 390 performs similar functions to those of the first alignment layer 190. That is, the second alignment layer 390 controls the initial alignment of the liquid crystal molecules 210 in the liquid crystal layer 200.

The liquid crystal layer 200 will hereinafter be described.

The liquid crystal layer 200 includes the liquid crystal molecules 210, which have dielectric anisotropy and refractive anisotropy. In an exemplary embodiment, the liquid crystal molecules 210 may be of a vertical alignment ("VA") mode, for example. That is, the liquid crystal molecules 210 may be vertically aligned between two substrates, i.e., the first and second display substrates 100 and 300. In response to an electric field being applied between the first and second display substrates 100 and 300, the liquid crystal molecules 210 may rotate in a particular direction, or may be tilted, between the first and second display substrates 100 and 300, thereby changing the polarization of light.

Figure 6:
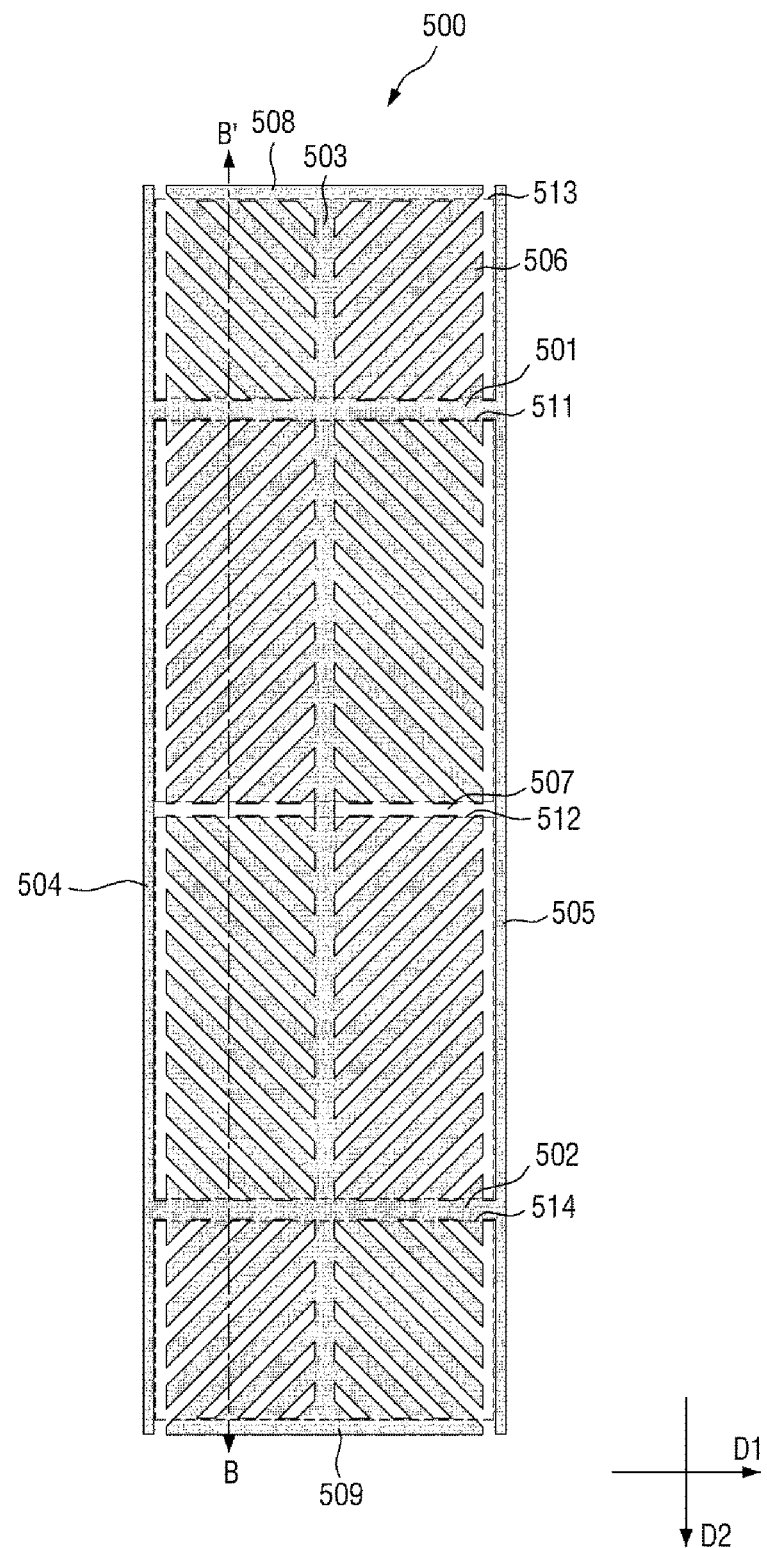
FIG. 6 is a plan view of another exemplary embodiment of a pixel electrode of an LCD device according to the invention.

FIG. 6 is a plan view of a pixel electrode of an LCD device according to another exemplary embodiment of the invention.

In the exemplary embodiments of FIGS. 1 and 6, like reference numerals indicate like elements, and thus, descriptions thereof will be omitted or at least simplified. The exemplary embodiment of FIG. 6 will hereinafter be described, focusing mainly on differences from the exemplary embodiment of FIG. 1.

Referring to FIG. 6, a pixel electrode 500, unlike the pixel electrode 182 of FIG. 3, may further include fourth and fifth stem electrodes 508 and 509.

The fourth stem electrode 508 may extend in a first direction D1 and may be connected to a first end (for example, the upper end) of a third stem electrode 503. The fifth stem electrode 509 may extend in the first direction D1 and may be connected to a second end (for example, the lower end) of the third stem electrode 503. The fourth and fifth stem electrodes 508 and 509 may be connected to the ends of some of a plurality of branch electrodes 506. A boundary line 507, which extends in the first direction D1, may be defined between the first and second stem electrodes 501 and 502.

A first edge area 513 may be surrounded by a first stem electrode 501, the fourth stem electrode 508, a first edge electrode 504, and a second edge electrode 505, and the influence from the outside of the first edge area 513 on liquid crystal molecules 210 (refer to FIGS. 2, 4 and 5) in the first edge area 513 may be minimized.

Liquid crystal molecules 210 may be tilted toward the pixel electrode 500 on the outside of the pixel electrode 500. The liquid crystal molecules 210 are not aligned independently of one another, but are tilted in series, affecting one another. Thus, the liquid crystal molecules 210 may be tilted downward on the outside of the fourth stem electrode 508, and the liquid crystal molecules 210 on the outside of the first edge area 513 may be affected by the force to tilt the liquid crystal molecules 210 downward on the outside of the fourth stem electrode 508. However, the fourth stem electrode 508 may minimize the force applied to tilt the liquid crystal molecules 210 in the first edge area 513 downward. Thus, the angle that the direction in which the liquid crystal molecules 210 are tilted in the first edge area 513 defines with the first direction D1 may be minimized. This effect may be evident at a low gray level, as mentioned above, and the visibility of the LCD device according to the exemplary embodiment may be improved.

The improvement of the visibility of the LCD device according to the exemplary embodiment of FIG. 6 will hereinafter be described with reference to FIGS. 7 and 8.

Figure 7:
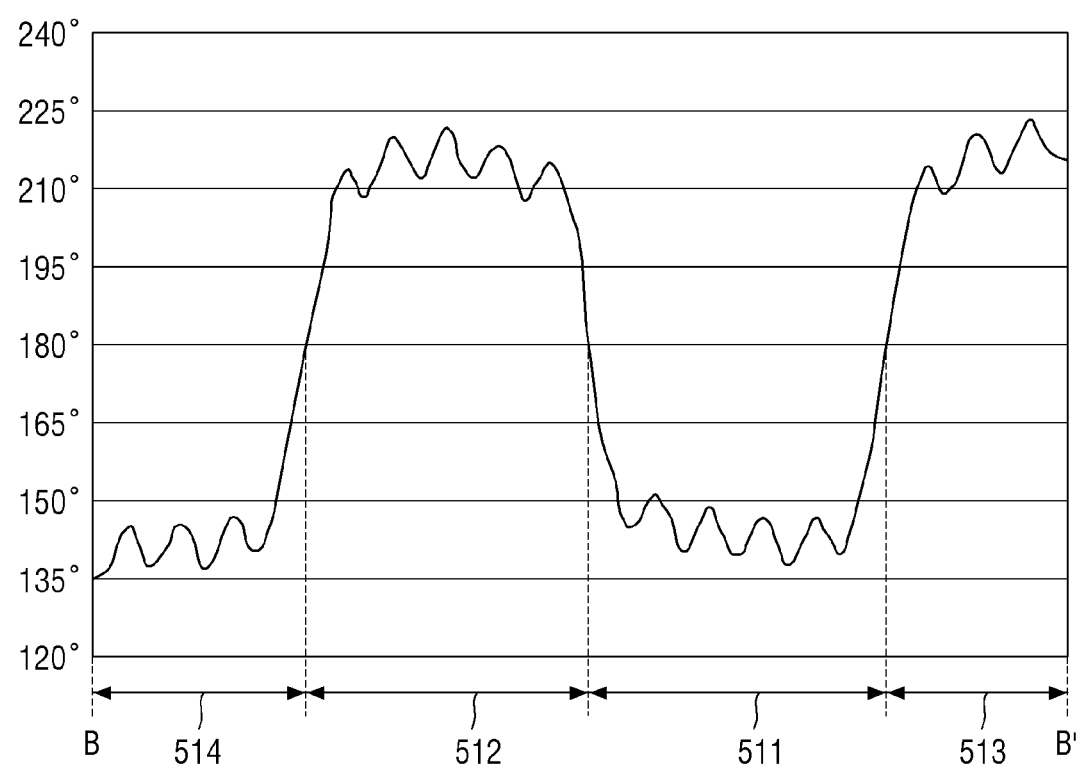
FIG. 7 is a graph showing measurements of the direction in which liquid crystal molecules are tilted, obtained from locations along line B-B' of FIG. 6, in a case in which a relatively low voltage is provided to the pixel electrode of the LCD device according to the exemplary embodiment of FIG. 6.
Figure 8:
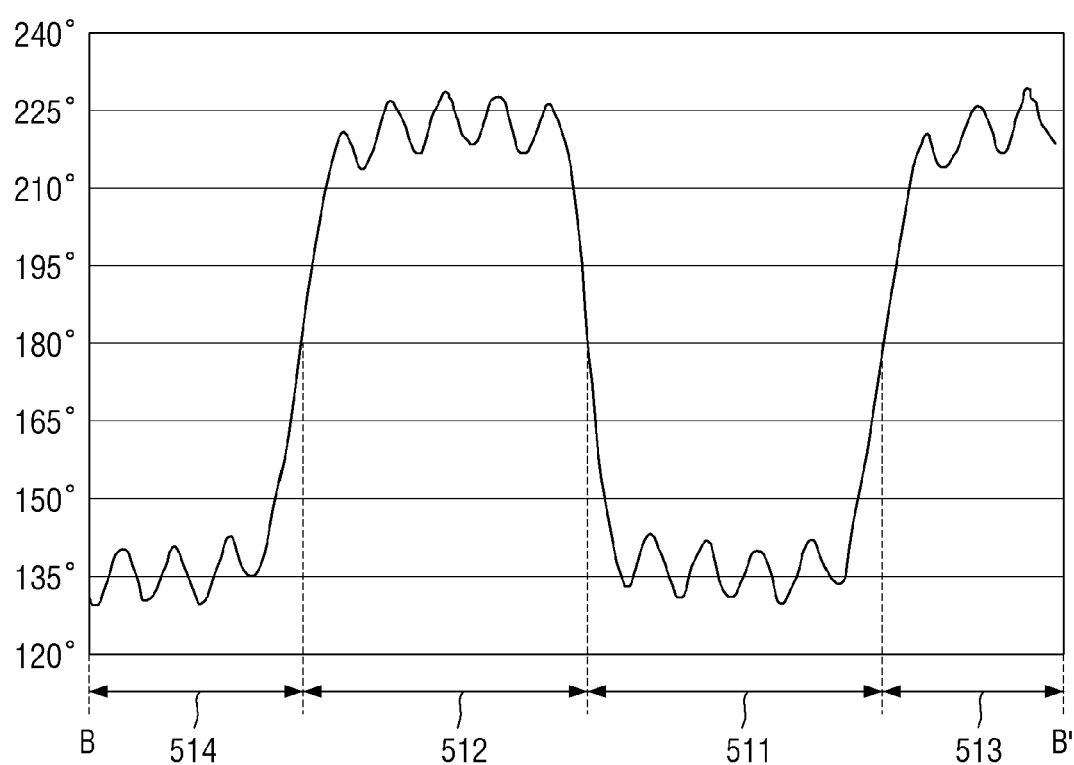
FIG. 8 is a graph showing measurements of the direction in which liquid crystal molecules are tilted, obtained from the locations along line B-B' of FIG. 6, in a case in which a relatively high voltage is provided to the pixel electrode of the LCD device according to the exemplary embodiment of FIG. 6.

FIG. 7 is a graph showing measurements of the direction in which the liquid crystal molecules 210 (refer to FIGS. 2, 4 and 5) are tilted, obtained from locations along line B-B' of FIG. 6, in a case in which a relatively low voltage is provided to the pixel electrode 500, and FIG. 8 is a graph showing measurements of the direction in which the liquid crystal molecules 210 are tilted, obtained from locations along line B-B' of FIG. 6, in a case in which a relatively high voltage is provided to the pixel electrode 500.

In FIGS. 7 and 8, the X-axis represents the locations along line B-B' of FIG. 6, and the Y-axis represents the direction in which the liquid crystal molecules 210 are tilted. More specifically, the Y-axis shows the angle at which the liquid crystal molecules 210 are tilted, measured clockwise from the opposite direction to the first direction D1 (i.e., a leftward direction).

Since line B-B' of FIG. 6 is located in the left half of a pixel region 11, the closer the angle at which the liquid crystal molecules 210 are tilted is to about 180°, the darker the LCD device according to the exemplary embodiment of FIG. 6 appears.

Referring to FIG. 7, at a low gray level, the liquid crystal molecules 210 are tilted at an angle greater than about 135° in a second edge area 514 and a first central area 511. Referring to FIG. 8, at a high gray level, the liquid crystal molecules 210 are tilted at an angle close to about 135° in the second edge area 514 and the first central area 511.

Referring to FIG. 7, at a low gray level, the liquid crystal molecules 210 are tilted at an angle smaller than about 225° in a second edge area 512 and the first edge area 513. Referring to FIG. 8, at a high gray level, the liquid crystal molecules 210 are tilted at an angle close to about 225° in the second edge area 512 and the first edge area 513.

That is, the angle at which the liquid crystal molecules 210 are tilted in the first and second central areas 511 and 512 and the first and second edge areas 513 and 514 at a low gray level may be closer to about 180° than the angle at which the liquid crystal molecules 210 are tilted in the first and second central areas 511 and 512 and the first and second edge areas 513 and 514 at a high gray level is, and thus, an improvement in the visibility of the LCD device according to the exemplary embodiment of FIG. 6 can be achieved.

Figure 9:
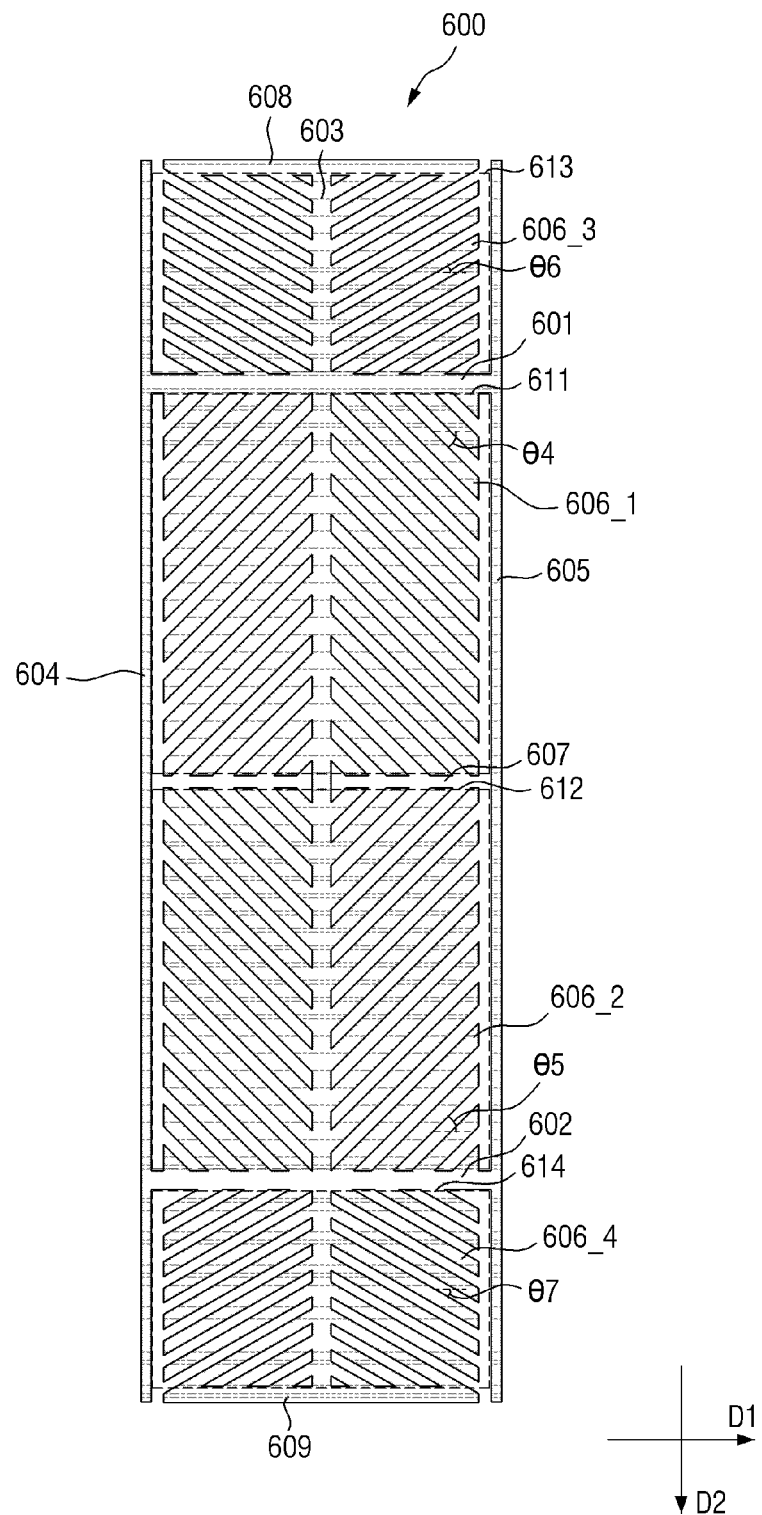
FIG. 9 is a plan view of another exemplary embodiment of a pixel electrode of an LCD device according to the invention.

FIG. 9 is a plan view of a pixel electrode of an LCD device according to another exemplary embodiment of the invention.

Referring to FIG. 9, branch electrodes 606_1, which are disposed in a first central area 611, extend to form a fourth angle θ4 with a first direction D1. Branch electrodes 606_2, which are disposed in a second central area 612, extend to form a fifth angle θ5 with the first direction D1. Branch electrodes 606_3, which are disposed in a first edge area 613, extend to form a sixth angle θ6 with the first direction D1. Branch electrodes 606_4, which are disposed in a second edge area 614, extend to form a seventh angle θ7 with the first direction D1.

The fourth and fifth angles θ4 and θ5 may be identical, and the sixth and seventh angles θ6 and θ7 may be identical. The fourth and sixth angles θ4 and θ6 may differ from each other. That is, the direction in which the branch electrodes of a pixel electrode 600 extend and the angle that the branch electrodes of the pixel electrode 600 define with the first direction D1 may differ from one part to another part of the pixel electrode 600.

Accordingly, even when the same voltage is provided throughout the pixel electrode 600, the direction in which liquid crystal molecules 210 (refer to FIGS. 2, 4 and 5) are tilted may be controlled differently in each part of the pixel electrode 600, and thus, the visibility of the LCD device according to the exemplary embodiment may be improved. Since the first and second central areas 611 and 612 can be clearly distinguished from the first edge area 613 by a first stem electrode 601, the improvement of the visibility of the LCD device according to the exemplary embodiment may be maximized. Also, since the first and second central areas 611 and 612 can be clearly distinguished from the second edge area 613 due to the presence of a first stem electrode 601, the improvement of the visibility of the LCD device according to the exemplary embodiment may be maximized.

The sixth and seventh angles θ6 and θ7 may be set to be smaller than the fourth and fifth angles θ4 and θ5. More specifically, the fourth and fifth angles θ4 and θ5 may be set to about 40° to about 45°, and the sixth and seventh angles θ6 and θ7 may be set to about 33° to about 40°, in which case, the first and second edge areas 613 and 614 may be rendered to appear darker than the first and second central areas 611 and 612, even when the same voltage is provided throughout the pixel electrode 600. In a case in which relatively bright areas are provided in the middle of a pixel region 11 (refer to FIG. 1) and relatively dark areas are provided on the edges f the pixel region 11, the visibility of the LCD device according to the exemplary embodiment may be improved, and at the same time, the pixel 10 (refer to FIG.1) may be clearly distinguished from its neighboring pixels.

The fourth stem electrode 608 may extend in a first direction D1 and may be connected to a first end (for example, the upper end) of a third stem electrode 603. The fifth stem electrode 609 may extend in the first direction D1 and may be connected to a second end (for example, the lower end) of the third stem electrode 603. A boundary line 607, which extends in the first direction D1, may be disposed between the first and second stem electrodes 601 and 602. A first edge area 613 may be surrounded by a first stem electrode 601, the fourth stem electrode 608, a first edge electrode 604, and a second edge electrode 605, and the influence from the outside of the first edge area 613 on liquid crystal molecules 210 in the first edge area 613 may be minimized.

Figure 10:
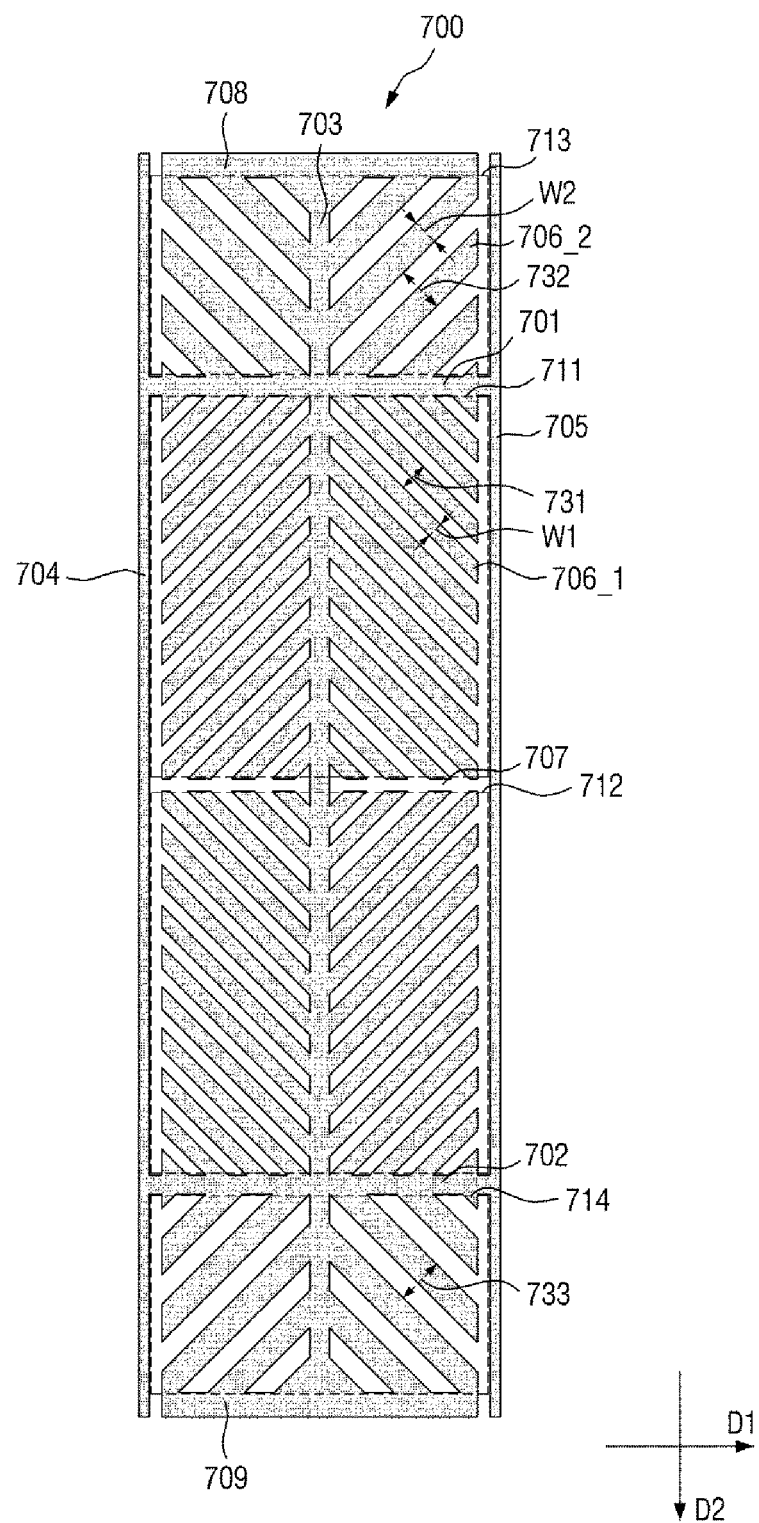
FIG. 10 is a plan view of another exemplary embodiment of a pixel electrode of an LCD device according to the invention.

FIG. 10 is a plan view of a pixel electrode of an LCD device according to another exemplary embodiment of the invention.

Referring to FIG. 10, a width W1 of branch electrodes 706_1, which are disposed in first and second central areas 711 and 712, may differ from a width W2 of branch electrodes 706_2, which are disposed in first and second edge areas 713 and 714. Here, the width may be taken along a direction perpendicular to an extension direction of the branch electrodes 706_1 and 706_2.

In an exemplary embodiment, the width W2 of the branch electrodes 706_2, which are disposed in the first and second edge areas 713 and 714, may be greater than the width W1 of the branch electrodes 706_1, which are disposed in the first and second central areas 711 and 712.

Also, a distance between adjacent branch electrodes 706_1, which are disposed in the s first and second central areas 711 and 712, may differ from a distance between adjacent branch electrodes 706_2, which are disposed in the first and second edge areas 713 and 714.

In an exemplary embodiment, the distance between adjacent branch electrodes 706_2, which are disposed in the first and second edge areas 713 and 714, may be greater than the distance between adjacent branch electrodes 706_1, which are disposed in the first and second central areas 711 and 712.

Thus, a second pitch 732 or a third pitch 733, which is the sum of the widths of one of the branch electrodes 706_2 in the first and second edge areas 713 and 714 and an opening adjacent thereto, may be greater than a first pitch 731, which is the sum of the widths of one of the branch electrodes 706_1 in the first and second central areas 711 and 712 and an opening adjacent thereto. The smaller the pitch of a pixel electrode 700 is, the stronger the control over liquid crystal molecules 210 becomes, and thus, the brighter the pixel electrode 700 appears. The greater the pitch of the pixel electrode 700 is, the weaker the control over the liquid crystal molecules 210 becomes, and thus, the darker the pixel electrode 700 appears. Thus, even when the same voltage is provided throughout the pixel electrode 700, the first and second edge areas 713 and 714 may appear relatively darker than the first and second central areas 711 and 712, and the visibility of the LCD device according to the exemplary embodiment may be improved.

The fourth stem electrode 708 may extend in a first direction D1 and may be connected to a first end (for example, the upper end) of a third stem electrode 703. The fifth stem electrode 709 may extend in the first direction D1 and may be connected to a second end (for example, the lower end) of the third stem electrode 703. A boundary line 707, which extends in the first direction D1, may be defined between the first and second stem electrodes 701 and 702. A first edge area 713 may be surrounded by a first stem electrode 701, the fourth stem electrode 708, a first edge electrode 704, and a second edge electrode 705, and the influence from the outside of the first edge area 713 on liquid crystal molecules 210 in the first edge area 713 may be minimized.

The structure of the pixel electrode 700 and the structure of the pixel electrode 600 of FIG. 9 may both be employed in a single LCD device, in which case, the improvement of the visibility of the LCD device may be further maximized.

Figure 11:
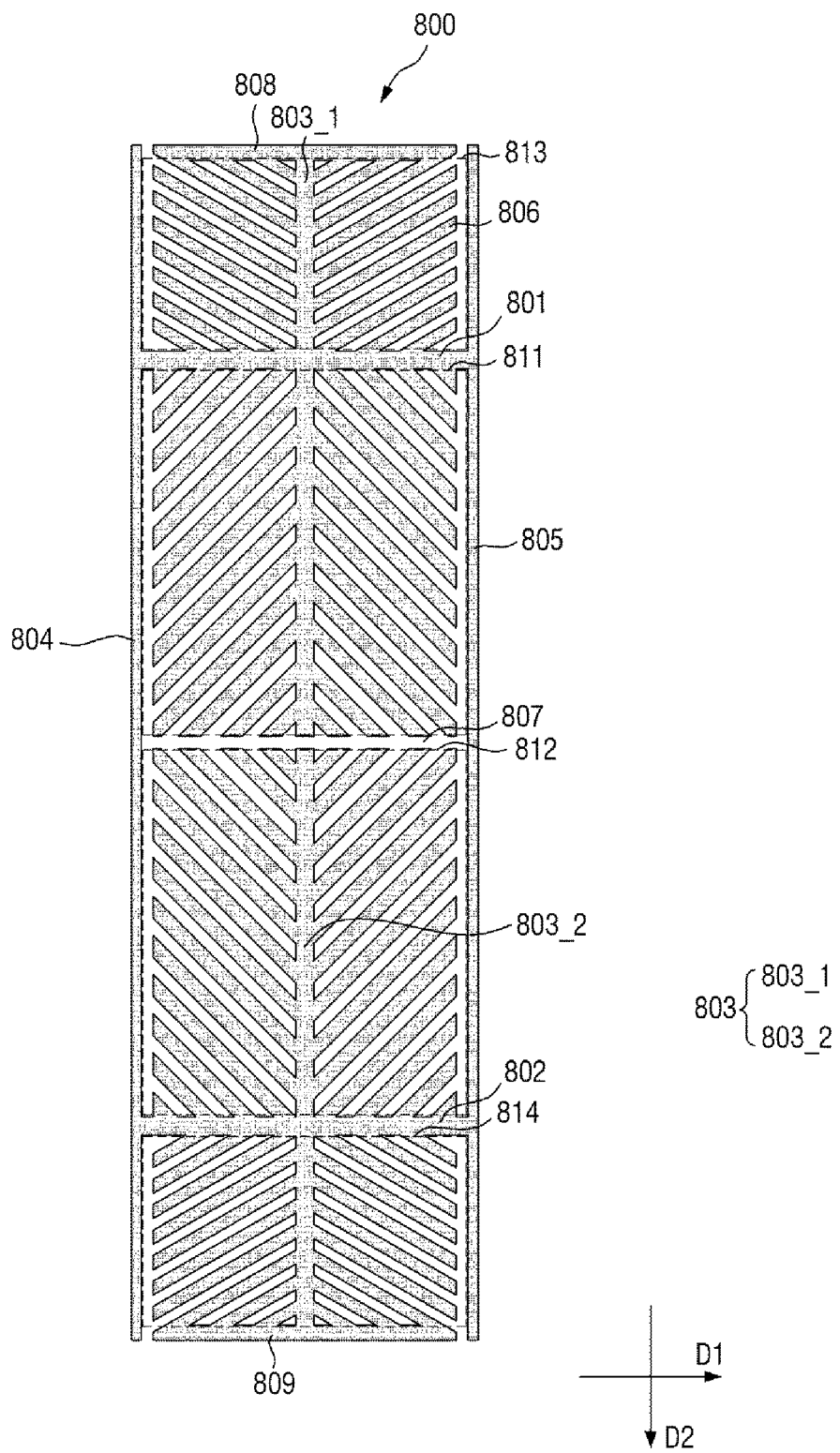
FIG. 11 is a plan view of another exemplary embodiment of a pixel electrode of an LCD device according to the invention.

FIG. 11 is a plan view of a pixel electrode of an LCD device according to another exemplary embodiment of the invention.

Referring to FIG. 11, a third stem electrode 803 may be divided into first and second sub-stem electrodes 803_1 and 803_2. The third stem electrode 803 differs from the third stem electrode 503 of FIG. 6, which is integrally provided on the entire surface of the pixel region 11 and extends in the second direction D2.

That is, the third stem electrode 803 may be divided into two parts, i.e., the first and second sub-stem electrodes 803_1 and 803_2, by a boundary line 807.

Since the third stem electrode 803 is divided into the first and second sub-stem electrodes 803_1 and 803_2, first and second central areas 811 and 812 may be clearly distinguished from each other.

Even though the third stem electrode 803 is divided into the first and second sub-stem electrodes 803_1 and 803_2, the first and second sub-stem electrodes 803_1 and 803_2 may be physically connected to each other via first and second stem electrodes 801 and 802 and first and second edge electrodes 803 and 805. Thus, the same voltage may be provided throughout a pixel electrode 800.

The fourth stem electrode 808 may extend in a first direction D1 and may be connected to a first end (for example, the upper end) of a third stem electrode 803_1. The fifth stem electrode 809 may extend in the first direction D1 and may be connected to a second end (for example, the lower end) of the third stem electrode 803_2. A first edge area 813 may be surrounded by a first edge electrode 801, the fourth stem electrode 808, a first edge electrode 804, and a second edge electrode 805, and the influence from the outside of the first edge area 813 on liquid crystal molecules 210 in the first edge area 813 may be minimized. The second edge area 814 may be symmetrical to the first edge area 813.

Figure 12:
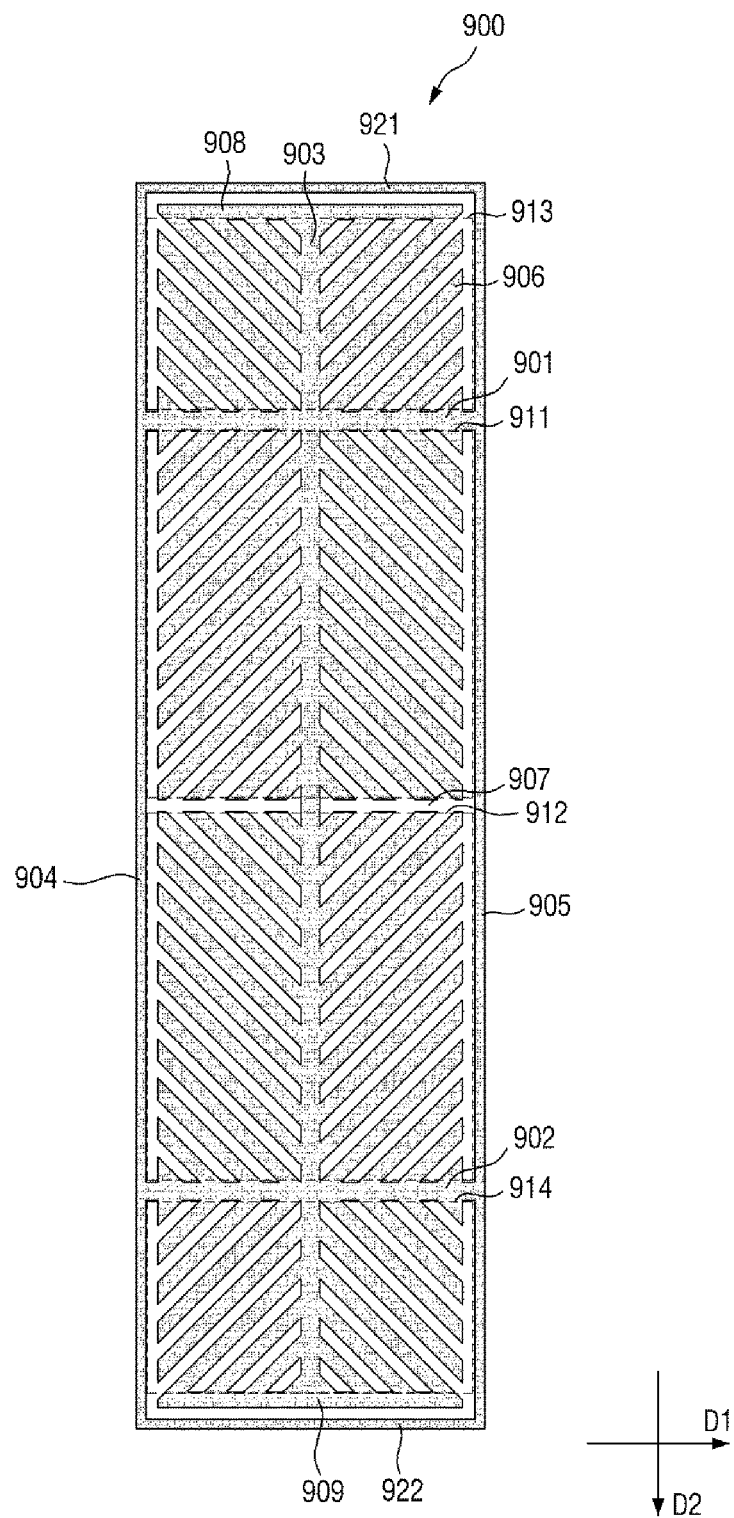
FIG. 12 is a plan view of another exemplary embodiment of a pixel electrode of an LCD device according to the invention.

FIG. 12 is a plan view of a pixel electrode of an LCD device according to another exemplary embodiment of the invention.

Referring to FIG. 12, a pixel electrode 900, unlike the pixel electrode 500 of FIG. 6, further includes third and fourth edge electrodes 921 and 922.

The third edge electrode 921 may extend in a first direction D1 to connect a first end (for example, the upper end) of a first edge electrode 904 and a first end (for example, the upper end) of a second edge electrode 905. The fourth edge electrode 922 may extend in the first direction D1 to connect a second end (for example, the lower end) of the first edge electrode 904 and a second end (for example, the lower end) of the second edge electrode 905.

Thus, the first, second, third, and fourth edge electrodes 904, 905, 921, and 922 may be connected to one another to have a rectangular shape. Accordingly, the influence of liquid crystal molecules on the outside of the first, second, third, and fourth edge electrodes 904, 905, 921, and 922 on liquid crystal molecules 210 on the inside of the first, second, third, and fourth edge electrodes 904, 905, 921, and 922 may be minimized. As a result, the improvement of the visibility of the LCD device according to the exemplary embodiment may be maximized.

The fourth stem electrode 908 may extend in a first direction D1 and may be connected to a first end (for example, the upper end) of a third stem electrode 903. The fifth stem electrode 909 may extend in the first direction D1 and may be connected to a second end (for example, the lower end) of the third stem electrode 903. A boundary line 907, which extends in the first direction D1, may be defined between the first and second stem electrodes 901 and 902. A first edge area 913 may be surrounded by a first stem electrode 901, the fourth stem electrode 908, a first edge electrode 904, and a second edge electrode 905, and the influence from the outside of the first edge area 913 on liquid crystal molecules 210 in the first edge area 913 may be minimized. The second edge area 914 may be symmetrical to the first edge area 913.

Figure 13:
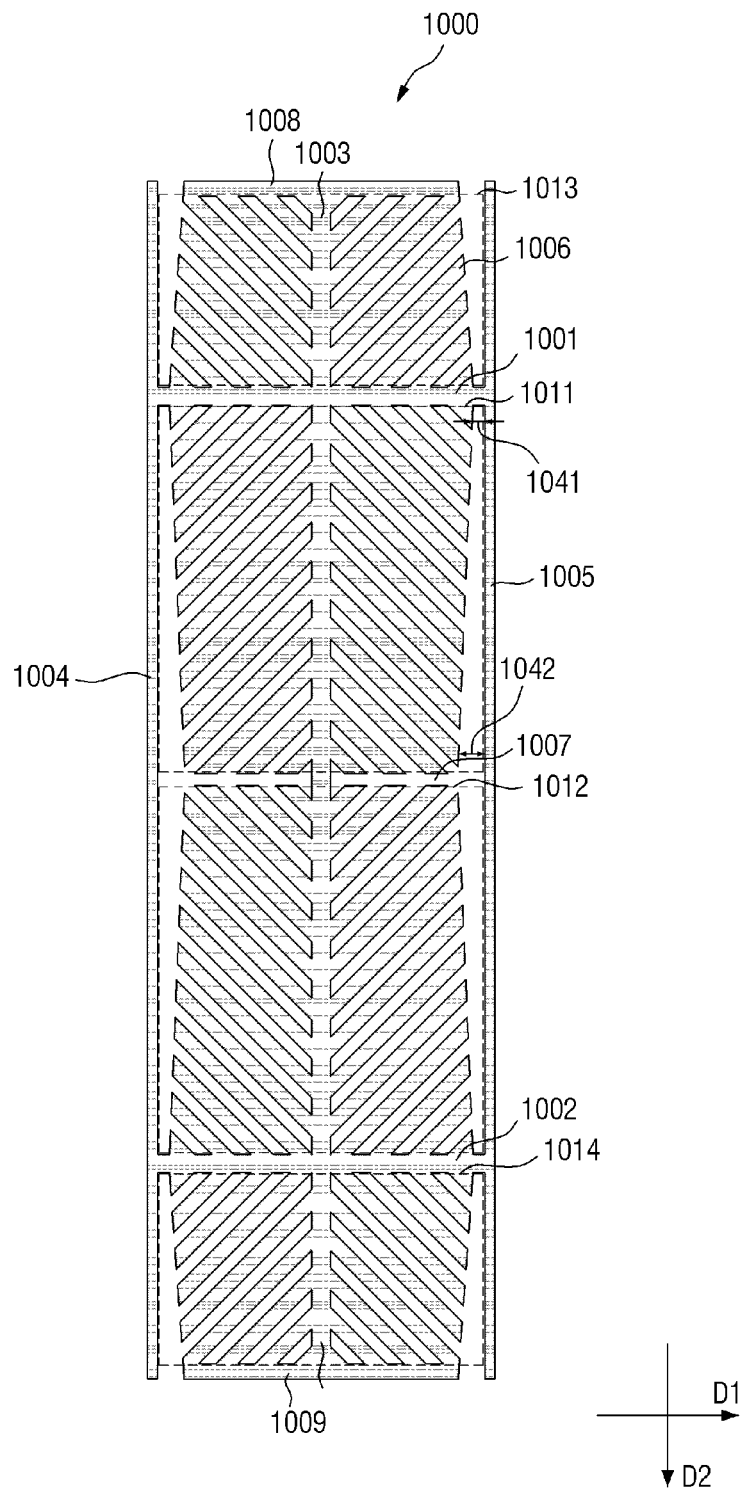
FIG. 13 is a plan view of another exemplary embodiment of a pixel electrode of an LCD device according to the invention.

FIG. 13 is a plan view of a pixel electrode of an LCD device according to another exemplary embodiment of the invention.

Referring to FIG. 13, a distance between a first or second edge electrode 1004 or 1005 and the ends of branch electrodes 1006 may differ from one part to another part of a pixel region 11 (refer to FIG. 1). More specifically, the distance between the first or second edge electrode 1004 or 1005 and the ends of the branch electrodes 1006 may become smaller, closer to a first or second stem electrode 1001 or 1002. The distance between the first or second edge electrode 1004 or 1005 and the ends of the branch electrodes 1006 may become greater, closer to a boundary line 1007.

In an exemplary embodiment, the distance between the first or second edge electrode 1004 or 1005 and the ends of the branch electrodes 1006 may be set to be within the range of about 1 μm to about 7 μm, for example.

In an exemplary embodiment, a first distance 1041, which is the distance between the end of an uppermost branch electrode 1006 in a first central area 1011 and the second edge electrode 1005 may be smaller than a second distance 1042, which is the distance between the end of a lowermost branch electrode 1006 and the second edge electrode 1005, for example.

The fourth stem electrode 1008 may extend in a first direction D1 and may be connected to a first end (for example, the upper end) of a third stem electrode 1003. The fifth stem electrode 1009 may extend in the first direction D1 and may be connected to a second end (for example, the lower end) of the third stem electrode 1003. A boundary line 1007, which extends in the first direction D1, may be defined between the first and second stem electrodes 1001 and 1002. A first edge area 1013 may be symmetrical to the second edge area 1014, and the first central area 1011 may be symmetrical to the second central area 1012.

Due to the aforementioned structure of the pixel electrode 1000, the improvement of the visibility of the LCD device according to the exemplary embodiment may be maximized.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display device comprising:
    a plurality of pixels each including a pixel electrode, the pixel electrode including:
        first and second stem electrodes, which extend in a first direction and are spaced apart from each other,
        a third stem electrode, which extends in a second direction which is perpendicular to the first direction and intersects the first and second stem electrodes,
        a first edge electrode, which extends in the second direction and is connected to first ends of the first and second stem electrodes,
        a second edge electrode, which extends in the second direction and is connected to second ends of the first and second stem electrodes, and
        a plurality of branch electrodes, which extend from at least one of the first, second, and third stem electrodes in a direction which is different from the first and second directions,
    wherein
    a boundary line, which is defined by ends of at least two of the plurality of branch electrodes facing each other, is defined between the first and second stem electrode, and
    a first central area is defined between the first stem electrode and the boundary line, a second central area is defined between the boundary line and the second stem electrode, and a first edge area is opposite to the first central area with reference to the first stem electrode and a second edge area is opposite to the second central area with reference to the second stem electrode.

2. The liquid crystal display device of claim 1, wherein: the pixel electrode further includes a fourth stem electrode, which extends in the first direction and intersects a first end of the third stem electrode.

3. The liquid crystal display device of claim 2, wherein: each of the plurality of pixel electrodes further includes a third edge electrode, which extends from ends of the first and second edge electrodes in the first direction and connects the first and second edge electrodes.

4. The liquid crystal display device of claim 1, wherein: a first angle which a branch electrode of the plurality of branch electrodes defines with the second direction in at least one of the first and second edge areas differs from a second angle which a branch electrode of the plurality of branch electrodes defines with the second direction in at least one of the first and second central areas.

5. The liquid crystal display device of claim 4, wherein the first and second angles are about 45° or less.

6. The liquid crystal display device of claim 5, wherein:
    the first angle is about 33 degrees to about 40 degrees; and
    the second angle is about 40 degrees to about 45 degrees.

7. The liquid crystal display device of claim 5, wherein the first angle is smaller than the second angle.

8. The liquid crystal display device of claim 1, wherein a pitch of a branch electrode of the plurality of branch electrodes in at least one of the first and second edge areas differs from a pitch of a branch electrode of the plurality of branch electrodes in at least one of the first and second central areas.

9. The liquid crystal display device of claim 8, wherein a width of the branch electrode of the plurality of branch electrodes in at least one of the first and second edge areas differs from a width of the branch electrode of the plurality of branch electrodes in at least one of the first and second central areas.

10. The liquid crystal display device of claim 9, wherein:
    the pitch of the branch electrode of the plurality of branch electrodes in at least one of the first and second edge areas is greater than the pitch of the branch electrode of the plurality of branch electrodes in at least one of the first and second central areas; and
    the width of the branch electrode of the plurality of branch electrodes in at least one of the first and second edge areas is greater than the width of the branch electrode of the plurality of branch electrodes in at least one of the first and second central areas.

11. The liquid crystal display device of claim 1, wherein:
    the third stem electrode includes first and second sub-stem electrodes;
    the first and second sub-stem electrodes are spaced apart from each other and are aligned in a straight line in the second direction;
    the first stem electrode intersects the first sub-stem electrode; and
    the second stem electrode intersects the second sub-stem electrode.

12. The liquid crystal display device of claim 11, wherein the first and second sub-stem electrodes are spaced apart by the boundary line.

13. The liquid crystal display device of claim 1, wherein a ratio of a sum of areas of the first and second central areas to a sum of areas of the first and second edge areas is about 1:1 to about 1:3.

14. The liquid crystal display device of claim 1, wherein:
    the boundary line extends in the first direction; and
    a width of the boundary line is about 2 micrometers to about 10 micrometers.

15. The liquid crystal display device of claim 1, wherein a distance between the first edge electrode and the ends of the plurality of branch electrodes becomes smaller, closer to the first and second stem electrodes, and becomes greater, closer to the boundary line.

16. A liquid crystal display device comprising:
    a plurality of pixels each including a pixel electrode, the pixel electrode including:
        first and second stem electrodes, which extend in a first direction and are spaced apart from each other, a third stem electrode, which extends in a second direction which is perpendicular to the first direction and is disposed to intersect the first and second stem electrodes, a first edge electrode, which extends in the second direction and is connected to first ends of the first and second stem electrodes, a second edge electrode, which extends in the second direction and is connected to second ends of the first and second stem electrodes, and a plurality of branch electrodes, which extend from at least one of the first, second, and third stem electrodes in a direction which is different from the first and second directions, the plurality of branch electrodes including:

first branch electrodes which define a first central area between the first and second stem electrodes; and second branch electrodes which define a second central area between the first and second stem electrodes, wherein, a boundary line is defined between the first central area and the second central area and extends along the first direction, a first edge area is opposite to the first central area with reference to the first stem electrode, a second edge area is opposite to the second central area with reference to the second stem electrode, and the first branch electrodes and the second branch electrodes are symmetrical to each other with reference to the boundary line.

17. The liquid crystal display device of claim 16, wherein the first branch electrodes include:

first sub-branch electrodes which are disposed in a first sub-central area which is defined by the first edge electrode and the third stem electrode;

second sub-branch electrodes which are disposed in a second sub-central area which is opposite to the first sub-central area with reference to the third stem electrode; and the first sub-branch electrodes and the second sub-branch electrodes are symmetrical to each other with reference to the third stem electrode.

18. The liquid crystal display device of claim 17, wherein the second branch electrodes include:

third sub-branch electrodes which are disposed in a third sub-central area which is defined by the first edge electrode and the third stem electrode; and fourth sub-branch electrodes which are disposed in a fourth sub-central area which is opposite to the third sub-central area with reference to the third stem electrode; and the third sub-branch electrodes and the fourth sub-branch electrodes are symmetrical to each other with reference to the third stem electrode.

19. The liquid crystal display device of claim 16, further comprising:

a liquid crystal layer disposed on the pixel electrode and comprising a plurality of liquid crystal molecules, wherein a first angle which a direction in which liquid crystal molecules of the plurality of liquid crystal molecules are tilted in at least one of the first and second central area defines with the first direction is smaller than a second angle which a direction in which liquid crystal molecules of the plurality of liquid crystal molecules are tilted in at least one of the first and second edge areas defines with the first direction.

20. The liquid crystal display device of claim 19, wherein the first angle is greater when a high voltage is applied to the pixel electrode than when a low voltage is applied to the pixel electrode.

* * * * *